United States Patent
Kato et al.

(10) Patent No.: US 9,003,884 B2
(45) Date of Patent: Apr. 14, 2015

(54) OSCILLATION TYPE INERTIA FORCE SENSOR

(75) Inventors: Yoshitaka Kato, Nagaokakyo (JP); Akira Mori, Nagaokakyo (JP); Makoto Narita, Chiyoda-ku (JP); Yoshihiko Koizumi, Chiyoda-ku (JP)

(73) Assignees: Murata Manufacturing Co., Ltd., Kyoto (JP); Asahi Kasei Microdevices Corporation, Tokyo (JP)

( * ) Notice: Subject to any disclaimer, the term of this patent is extended or adjusted under 35 U.S.C. 154(b) by 315 days.

(21) Appl. No.: 13/569,209

(22) Filed: Aug. 8, 2012

(65) Prior Publication Data

US 2012/0291550 A1  Nov. 22, 2012

Related U.S. Application Data

(63) Continuation of application No. PCT/JP2010/073717, filed on Dec. 28, 2010.

(30) Foreign Application Priority Data

Feb. 17, 2010  (JP) .................................. 2010-032399

(51) Int. Cl.
*G01C 19/56* (2012.01)
*G01C 19/5776* (2012.01)

(52) U.S. Cl.
CPC .................................. *G01C 19/5776* (2013.01)

(58) Field of Classification Search
CPC .............. G01C 19/5719; G01C 19/56; G01C 19/5607; G01C 19/5649; G01C 19/5642; G01C 19/5663; G01C 19/5635; G01C 19/5621; G01C 19/5628
USPC ............... 73/504.12, 504.14, 504.16, 504.02, 73/504.04
See application file for complete search history.

(56) References Cited

U.S. PATENT DOCUMENTS 4,222,270 A * 9/1980 Allen ......................... 73/504.11
5,225,889 A    7/1993 Fritze et al.
(Continued)

FOREIGN PATENT DOCUMENTS

CN    101184973 A    5/2008
JP    06-074774 A    3/1994
(Continued)

OTHER PUBLICATIONS

Official Communication issued in International Patent Application No. PCT/JP2010/073717, mailed on Mar. 15, 2011.
(Continued)

*Primary Examiner* — Helen Kwok
(74) *Attorney, Agent, or Firm* — Keating & Bennett, LLP

(57) ABSTRACT

An oscillation type inertia force sensor includes an oscillator, an oscillation circuit unit, and a detection circuit unit. The oscillation circuit unit functions as a self oscillation circuit of a closed loop with the oscillator as a resonant element, and includes an AGC circuit. The AGC circuit includes a VGA circuit, a comparison circuit comparing a predetermined reference voltage with a voltage of the monitor signal to output a control signal based on the compared result, and a pulse width modulation circuit modulating the control signal to a pulse width modulation signal. Based on the pulse width modulation signal, the driving signal is modulated with the output of the VGA circuit switched between an ON state and OFF state to control the degree of the amplification factor of the VGA circuit.

3 Claims, 13 Drawing Sheets

(56) References Cited

U.S. PATENT DOCUMENTS

| | | |
|---|---|---|
| 5,635,787 A | 6/1997 | Mori et al. |
| 5,831,164 A | 11/1998 | Reddi et al. |
| 6,311,555 B1* | 11/2001 | McCall et al. ................. 73/488 |
| 6,718,823 B2* | 4/2004 | Platt ........................... 73/504.12 |
| 7,353,705 B2* | 4/2008 | Mori et al. ................. 73/504.12 |
| 7,788,977 B2* | 9/2010 | Nagata ........................ 73/504.12 |
| 8,225,661 B2* | 7/2012 | Mori et al. ................. 73/504.12 |
| 2003/0200803 A1 | 10/2003 | Platt |
| 2007/0144256 A1* | 6/2007 | Mori et al. ................. 73/504.12 |
| 2007/0261488 A1* | 11/2007 | Murashima ................ 73/504.04 |
| 2008/0148847 A1* | 6/2008 | Sato et al. .................. 73/504.12 |
| 2009/0071247 A1* | 3/2009 | Konaka ....................... 73/504.14 |
| 2010/0011856 A1 | 1/2010 | Nagata |
| 2010/0095772 A1* | 4/2010 | Uemura ..................... 73/504.16 |
| 2010/0107759 A1* | 5/2010 | Kato .......................... 73/504.12 |

FOREIGN PATENT DOCUMENTS

| | | |
|---|---|---|
| JP | 2000-283767 A | 10/2000 |
| JP | 2005-524077 A | 8/2005 |
| JP | 2005-345109 A | 12/2005 |
| JP | 2009-168588 A | 7/2009 |
| WO | 2010/092629 A1 | 8/2010 |

OTHER PUBLICATIONS

Kato et al., "Oscillation Type Inertia Force Sensor,", U.S. Appl. No. 13/569,207, filed Aug. 8, 2012.

* cited by examiner

OSCILLATION TYPE INERTIA FORCE SENSOR

BACKGROUND OF THE INVENTION

1. Field of the Invention

The present invention relates to an inertia force sensor that detects an inertia force, particularly an oscillation type inertia force sensor that detects an inertia force using an oscillator.

2. Description of the Related Art

An oscillation type inertia force sensor is employed as, for example, an angular velocity sensor detecting the angular velocity based on inertia force. An oscillation type inertia force sensor includes an oscillator for detecting angular velocity, an oscillation circuit unit supplying a driving signal to the oscillator, and a detection circuit unit detecting the angular velocity of the oscillator. An oscillator includes an electrostatic driving and capacitance detection type, a piezoelectric driving and detection type, or the like. An oscillator includes an oscillating body that oscillates due to the angular velocity, driving means for driving the oscillating body, monitor means for feeding back to an oscillation circuit unit a monitor signal according to the degree of amplitude of the oscillating body (oscillating state of the oscillator), and detection means for providing a detection signal based on the oscillatory displacement caused by a Coriolis force of the oscillating body.

The oscillation circuit unit is formed as a self oscillation circuit of a closed loop with the oscillator as the resonant element to generate a driving signal from a monitor signal according to the degree of the amplitude of the oscillating body and supplies the driving signal to the oscillator to control the drive of the oscillating body. The detection circuit unit generates and outputs an angular velocity detection signal based on the detection signal applied from the detection means of the oscillator. The angular velocity detection signal corresponds to a DC voltage in accordance with the degree of the angular velocity of the oscillator.

The oscillation type inertia force sensor has the detection sensitivity of the angular velocity stabilized by constituting the oscillation circuit unit as a self oscillation circuit. However, there was the case where the detection sensitivity of the angular velocity is rendered unstable due to environmental change such as the ambient temperature and/or power supply voltage of the oscillator or by temporal change. A circuit configuration allowing the detection sensitivity of the angular velocity at an oscillation type inertia force sensor to be stabilized is disclosed in Japanese Patent Laying-Open No. 6-74774 and Japanese Patent Laying-Open No. 2000-283767. The oscillation type inertia force sensor disclosed in Japanese Patent Laying-Open No. 6-74774 includes an oscillator circuit unit having a phase circuit to adjust the phase of a monitor signal fed back from the monitor means of the oscillator, and an automatic gain control circuit (AGC circuit) amplifying the monitor signal. The oscillation type inertia force sensor of Japanese Patent Laying-Open No. 6-74774 has variation in the detection sensitivity of angular velocity exhibited as variation in the voltage of the monitor signal. By virtue of the AGC circuit controlling the voltage of a driving signal supplied to an oscillator based on variation in the voltage of the monitor signal, the detection sensitivity of the angular velocity can be rendered stable.

An oscillation type inertia force sensor disclosed in Japanese Patent Laying-Open No. 2000-283767 has an oscillation circuit unit (feedback amplifier) including an AGC circuit. The AGC circuit generates from a monitor signal a driving signal that renders constant the oscillation of the oscillating body and outputs the driving signal. The oscillation type inertia force sensor of Japanese Patent Laying-Open No. 2000-283767 can oscillate the oscillator always in a resonant state and at a constant oscillation, allowing the detection sensitivity of the angular velocity to be rendered stable even when the ambient temperature changes.

An AGC circuit is formed of a rectifying circuit, a comparison circuit, and a variable gain amplification circuit (VGA circuit). The rectifying circuit rectifies a monitor signal input to the AGC circuit. The comparison circuit compares the voltage of the monitor signal rectified by the rectifying circuit with a reference voltage, and outputs a control signal controlling the degree of the amplification factor (gain) of the VGA circuit based on the compared result. The VGA circuit amplifies the monitor signal applied to the AGC circuit at an amplification factor based on the control signal input from the comparison circuit for output as a driving signal.

According to conventional art, a VGA circuit is employed for controlling the degree of the amplification factor of the VGA circuit by the current/voltage of the VGA circuit, as disclosed in Japanese Patent Laying-Open No. 6-74774. By the physical property of the semiconductor constituting the VGA circuit, the amplification factor varies greatly depending upon the environmental change such as the ambient temperature and/or power supply voltage. The change in the amplification factor of the VGA circuit becomes non-linear to the change of the control signal. FIG. 12 is a circuit diagram representing a configuration of a conventional VGA circuit. The conventional VGA circuit will be described based on the circuit diagram of FIG. 12. The VGA circuit of FIG. 12 includes a MOSFET 100. By applying a control signal (AGCO signal) to the gate terminal of MOSFET 100, the transconductance Gm, Gds of MOSFET 100 is varied to control degree of the amplification factor of the VGA circuit. The amplification factor of the VGA circuit shown in FIG. 12 can be obtained as $[\{Ra+Rb+(Rc//(Gm+Gds))\}/\{Rb+(Rc//(Gm+Gds))\}]$ by resistances Ra, Rb, Rc and transconductance Gm, Gds. Since the threshold voltage, the mobility, and the like of MOSFET 100 affecting resistances Ra, Rb, Rc and transconductance Gm, Gds vary greatly depending upon the ambient temperature, the amplification factor of the VGA circuit shown in FIG. 12 greatly varies depending upon environmental change such as the ambient temperature and/or power supply voltage. Furthermore, since the VGA circuit is constituted by the change in the ON resistance of MOSFET 100, the change in the amplification factor becomes non-linear to the change of the control signal. Therefore, when an AGC circuit employing a conventional VGA circuit was employed in the oscillation circuit unit of an oscillation type inertia force sensor, the detection sensitivity of the inertia force (angular velocity) was greatly affected by the individual variation between oscillation type inertia force sensors, the variation in the semiconductor element's resistance and capacitance, MOSFET process parameter fluctuations, and environmental change such as the ambient temperature and/or power supply voltage. Furthermore, when an AGC circuit employing a conventional VGA circuit is used as the oscillation circuit unit of an oscillation type inertia force sensor, a linear relationship could be obtained only for a small range since the change in the amplification factor of the VGA circuit was non-linear to the change in the control signal. There was a problem that the variable range of the amplification factor of a VGA circuit that can be used during module designing becomes smaller.

SUMMARY OF THE INVENTION

In view of the foregoing, preferred embodiments of the present invention provide an oscillation type inertia force sensor of which the detection sensitivity of inertia force (angular velocity) is less susceptible to individual variation between oscillation type inertia force (angular velocity) sensors, the variation in the semiconductor element's resistance and capacitance, MOSFET process parameter fluctuations, and environmental change such as the ambient temperature and/or power supply voltage, and of which the change in the amplification factor of a VGA circuit is substantially linear to a change of a control signal.

An oscillation type inertia force sensor according to a first aspect of a preferred embodiment of the present invention includes an oscillator that detects inertia force, an oscillation circuit unit that supplies a driving signal to the oscillator, and a detection circuit unit that detects inertia force of the oscillator. The oscillation circuit unit functions as a self oscillation circuit of a closed loop with the oscillator as a resonant element, and includes an automatic gain control circuit that amplifies a monitor signal according to an oscillating state of the oscillator to generate and provide to the oscillator a driving signal. The automatic gain control circuit includes an amplification circuit that amplifies the monitor signal, a comparison circuit that compares a predetermined reference voltage with the voltage of the monitor signal, and that provides a control signal to control the degree of the amplification factor of the amplification circuit based on the compared result, and a pulse width modulation circuit that modulates the control signal output from the comparison circuit into a pulse width modulation signal having a frequency higher than the frequency of the monitor signal. Based on the pulse width modulation signal modulated at the pulse width modulation circuit, the driving signal is modulated with the output of the amplification circuit switched between an ON state and OFF state to control the degree of the amplification factor of the amplification circuit.

In the oscillation type inertia force sensor including an oscillator, an oscillation circuit unit, and a detection circuit unit according to the first aspect of a preferred embodiment of the present invention, the oscillation circuit unit includes an automatic gain control circuit, and functions as a self oscillation circuit of a closed loop with the oscillator as a resonant element. The automatic gain control circuit includes an amplification circuit, a comparison circuit that compares a predetermined reference voltage with the voltage of the monitor signal to output a control signal to control the degree of the amplification factor of the amplification circuit based on the compared result, and a pulse width modulation circuit that modulates the control signal output from the comparison circuit into a pulse width modulation signal having a frequency higher than that of the monitor signal. Accordingly, the degree of the amplification factor of the amplification circuit is controlled, not by the current/voltage of the amplification circuit, but by the switching period (pulse width). Specifically, based on a pulse width modulation signal modulated with the control signal at the pulse width modulation circuit, the driving signal is modulated with the output of the amplification circuit switched between an ON state and an OFF state to control the degree of the amplification factor of the amplification circuit. Therefore, the influence due to the physical property of the semiconductor constituting the amplification circuit can be reduced. Furthermore, the detection sensitivity of inertia force is less susceptible to individual variation between oscillation type inertia force sensors, the variation in the semiconductor element's resistance and capacitance, MOSFET process parameter fluctuations, and environmental change such as the ambient temperature and/or power supply voltage. The change in the amplification factor of the amplification circuit is substantially linear to a change of the control signal. Therefore, the variable range of the amplification factor of the VGA circuit that can be used in module designing can be increased.

An oscillation type inertia force sensor according to a second aspect of a preferred embodiment of the present invention includes, based on the first aspect, a demodulation circuit at a succeeding stage of the amplification circuit that demodulates the driving signal that has been modulated with the output of the amplification circuit switched between an ON state and OFF state based on the pulse width modulation signal.

Since the second aspect of a preferred embodiment of the present invention includes a demodulation circuit at a succeeding stage of the amplification circuit that demodulates the driving signal that has been modulated with the output of the amplification circuit switched between an ON state and OFF state based on the pulse width modulation signal, demodulation to a driving signal absent of a component of a pulse width modulation signal having a frequency higher than that of the monitor signal is allowed to avoid the output of the component of a pulse width modulation signal as noise of the detection signal from the detection circuit unit.

An oscillation type inertia force sensor according to a third aspect of a preferred embodiment of the present invention based on the first or second aspect is characterized in that, when the comparison circuit amplifies the difference between the predetermined reference voltage and the voltage of the monitor signal with a predetermined amplification factor of the control signal to output the control signal, the absolute value of a slope of the amplification factor of the amplification circuit to the ratio between the voltage of the monitor signal and the predetermined reference voltage is less than or equal to about 320 dB, for example.

Since the absolute value of the slope of the amplification factor of the amplification circuit to the ratio between the voltage of the monitor signal and the predetermined reference voltage is less than or equal to about 320 dB, for example, when the comparison circuit according to the third aspect of a preferred embodiment of the present invention amplifies the difference between the predetermined reference voltage and the voltage of the monitor signal with a predetermined amplification factor of the control signal to output the control signal, the inertia force can be detected in a range where the operation of the oscillation circuit unit is stable. When the comparison circuit amplifies the difference between the predetermined reference voltage and the voltage of the monitor signal with a predetermined amplification factor of the control signal to output the control signal and control the degree of the amplification factor of the amplification circuit, a slope of the amplification factor of the amplification circuit to the ratio between the voltage of the monitor signal and the predetermined reference voltage can be used as an index alternative to the amplification factor of the control signal. The ratio between the voltage of the monitor signal and the predetermined reference voltage is referred to as a monitor signal relative value, and is 1 when the monitor signal voltage is adjusted to a predetermined reference voltage. The slope of the amplification factor of the amplification circuit to the monitor signal relative value is always negative. The absolute value of the slope corresponds to the amplification factor of the control signal.

An oscillation type inertia force sensor according to a preferred embodiment of the present invention includes an oscillator, an oscillation circuit unit, and a detection circuit unit. The oscillation circuit unit includes an automatic gain control circuit, and functions as a self oscillation circuit of a closed loop with the oscillator as a resonant element. The automatic gain control circuit includes an amplification circuit, a comparison circuit that compares a predetermined reference voltage with the voltage of the monitor signal to output a control signal to control the degree of the amplification factor of the amplification circuit based on the compared result, and a pulse width modulation circuit that modulates the control signal output from the comparison circuit into a pulse width modulation signal having a frequency higher than that of the monitor signal. Therefore, the degree of the amplification factor of the amplification circuit is controlled, not by the current/voltage of the amplification circuit, but by the switching period (pulse width). Specifically, based on a pulse width modulation signal that is a modulated version of the control signal at the pulse width modulation circuit, the driving signal is modulated with the output of the amplification circuit switched between an ON state and an OFF state to control the degree of the amplification factor of the amplification circuit. Therefore, the influence due to the physical property of the semiconductor constituting the amplification circuit can be significantly reduced. Furthermore, the detection sensitivity of inertia force is less susceptible to individual variation between oscillation type inertia force sensors, the variation in the semiconductor element's resistance and capacitance, MOSFET process parameter fluctuations, and environmental change such as the ambient temperature and/or power supply voltage. The change in the amplification factor of the amplification circuit is substantially linear to a change of the control signal. Therefore, the variable range of the amplification factor of the VGA circuit that can be used in module designing can be increased.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Oscillation type inertia force sensors according to preferred embodiments of the present invention will be described hereinafter in detail with reference to the drawings. The preferred embodiments set forth below are not intended to restrict the present invention defined in the claims, and all the combinations of the features described in the preferred embodiments are not necessarily indispensable to the present invention.

Figure 1:
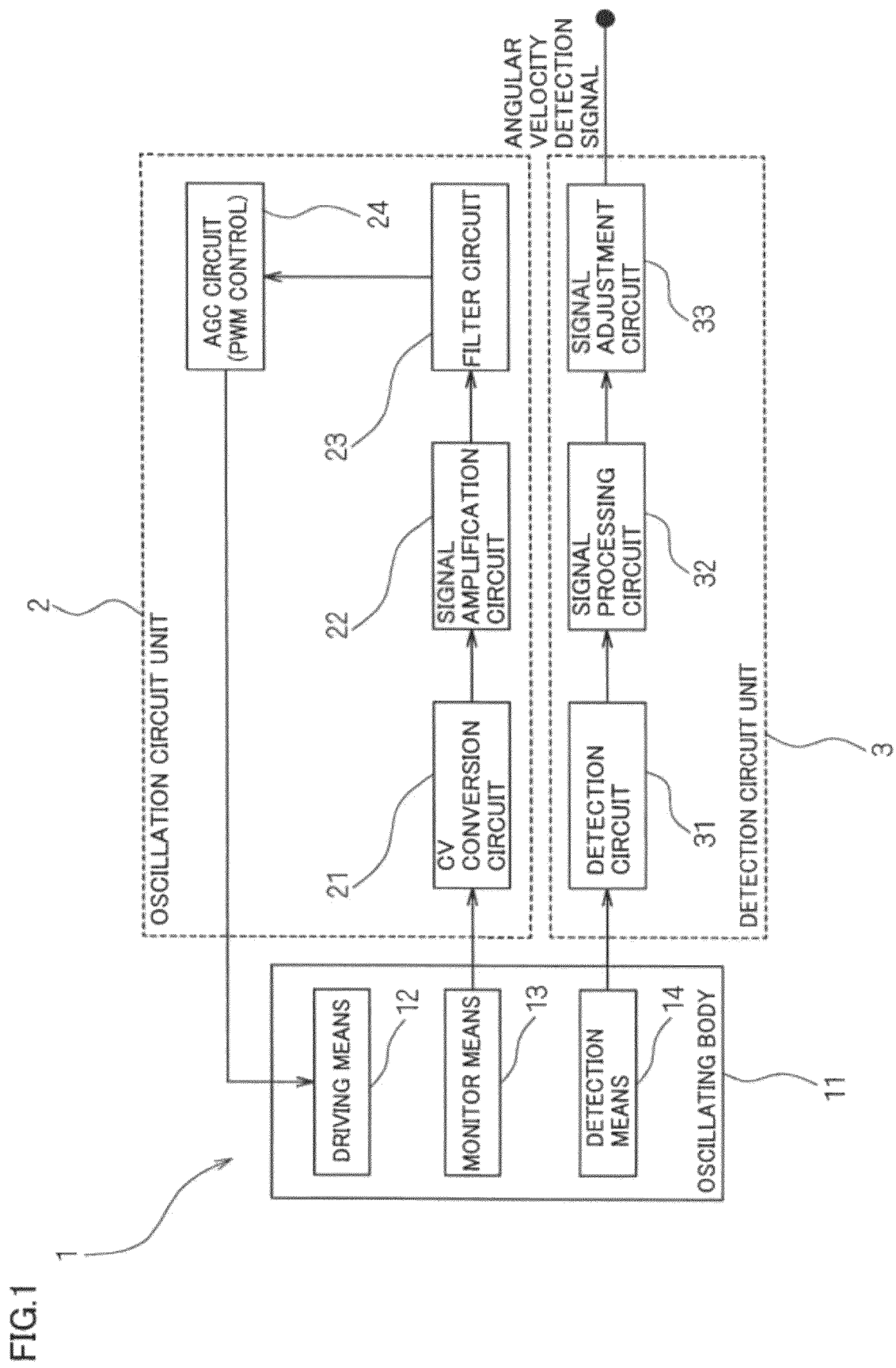
FIG. 1 is a block diagram representing a configuration of an oscillation type inertia force sensor according to a preferred embodiment of the present invention.

FIG. 1 is a block diagram representing a configuration of an oscillation type inertia force sensor according to a preferred embodiment of the present invention. The oscillation type inertia force sensor according to a preferred embodiment of the present invention will be described hereinafter as being used as an angular velocity sensor detecting angular velocity based on inertia force, for example. The oscillation type inertia force sensor of FIG. 1 includes an oscillator 1 that detects the angular velocity (inertia force), an oscillation circuit unit 2 that supplies a driving signal to oscillator 1, and a detection circuit unit 3 that detects the angular velocity of oscillator 1.

Oscillator 1 is of the electrostatic driving and capacitance detection type, and includes an oscillating body 11, driving element 12 that drives oscillating body 11, monitor 13 that feeds back a monitor signal according to the degree of amplitude of oscillating body 11 (oscillating state of oscillator 1) to oscillation circuit unit 2, and detector 14 that provides a detection signal based on oscillatory displacement due to a Coriolis force of oscillating body 11. Oscillating body 11 preferably includes an oscillation substrate made of silicon material, glass material, or other suitable material, for example.

Oscillation circuit unit 2 functions as a self oscillation circuit of a closed loop with oscillator 1 as a resonant element, and includes a CV conversion circuit 21, a signal amplification circuit 22, a filter circuit 23, and an AGC circuit (automatic gain control circuit) 24. AGC circuit 24 according to a preferred embodiment of the present invention modulates an output signal (pulse width modulation), as will be described below.

Oscillation circuit unit 2 is connected to driving element 12 and monitor 13 of oscillator 1, and the monitor signal from monitor 13 is fed back to CV conversion circuit 21. The monitor signal fed back from monitor 13 is based on the electrostatic capacitance corresponding to the degree of amplitude of oscillating body 11. CV conversion circuit 21 converts the monitor signal based on electrostatic capacitance corresponding to the degree of amplitude of oscillating body 11 into a monitor signal based on a voltage corresponding to the amount of change of electrostatic capacitance. Signal amplification circuit 22 amplifies the monitor signal converted at CV conversion circuit 21 with a predetermined amplification factor (gain). Filter circuit 23 removes a predetermined signal from the monitor signal amplified at signal amplification circuit 22. AGC circuit 24 amplifies the monitor signal applied from filter circuit 23 to supply the amplified monitor signal to driving element 12 as a driving signal of oscillator 1.

Detection circuit unit 3 includes a detection circuit 31, a signal processing circuit 32, and a signal adjustment circuit 33.

Detection circuit 31 converts the detection signal applied from detector 14 of oscillator 1 into a detection signal based on a voltage corresponding to the oscillatory displacement by Coriolis force of oscillating body 11 for output. Signal processing circuit 32 carries out signal processing such as extracting an angular velocity signal corresponding to the degree of the angular velocity from the detection signal applied from detection circuit 31. Signal adjustment circuit 33 makes adjustment and others of the phase of the detection signal processed at signal processing circuit 32 to output an angular velocity detection signal.

Figure 2:
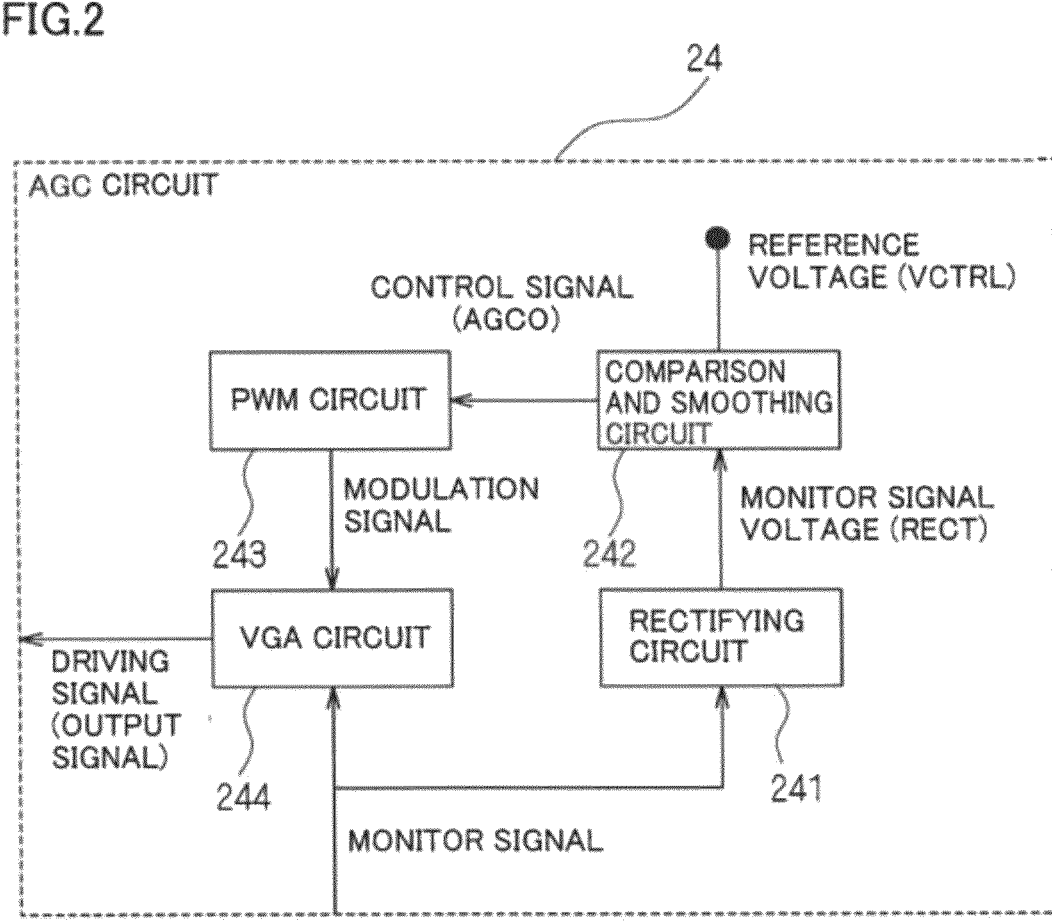
FIG. 2 is a block diagram representing a configuration of an AGC circuit of an oscillation type inertia force sensor according to a preferred embodiment of the present invention.

As set forth above, oscillation circuit unit 2 amplifies the monitor signal at AGC circuit 24 to supply the amplified monitor signal to driving element 12 as the driving signal for oscillator 1. FIG. 2 is a block diagram representing a configuration of AGC circuit 24 of the oscillation type inertia force sensor according to a preferred embodiment of the present invention. As shown in FIG. 2, AGC circuit 24 includes a rectifying circuit 241, a comparison and smoothing circuit 242, a PWM circuit (pulse width modulation circuit) 243, and a VGA circuit (variable gain amplification circuit) 244. VGA circuit 244 can control the degree of the amplification factor based on an AGCO signal (pulse width modulation signal) subjected to pulse width modulation at PWM circuit 243.

Rectifying circuit 241 rectifies the monitor signal applied from filter circuit 23 to convert into the voltage of the monitor signal (RECT voltage) that is DC voltage for output. Comparison and smoothing circuit 242 compares the RECT voltage output from rectifying circuit 241 with a predetermined reference voltage (VCTRL voltage) corresponding to the reference amplitude of oscillator 1, and outputs a control signal (AGCO signal) controlling the degree of the amplification factor (gain) of VGA circuit 244 based on the compared result. Comparison and smoothing circuit 242 smoothes the AGCO signal, as necessary, for output. The RECT voltage corresponds to the amplitude of oscillator 1 at the point in time when monitor 13 of oscillator 1 outputs a monitor signal. Therefore, the control error ΔV in an oscillation of oscillator 1 can be represented by the following Equation 1.

$$\Delta V = RECT - VCTRL \quad \text{(Equation 1)}$$

In Equation 1, RECT is the voltage of the monitor signal (RECT voltage), and VCTRL is the reference voltage (VCTRL voltage).

Control error ΔV has the relationship shown in Equation 2 to the AGCO signal.

$$AGCO = \Delta V \times Gctrl + VDD/2 \quad \text{(Equation 2)}$$

AGCO is the control signal (AGCO signal), GCtrl (>0) is the amplification factor based on the control signal, and VDD is the driving voltage of AGC circuit 24.

Figure 3:
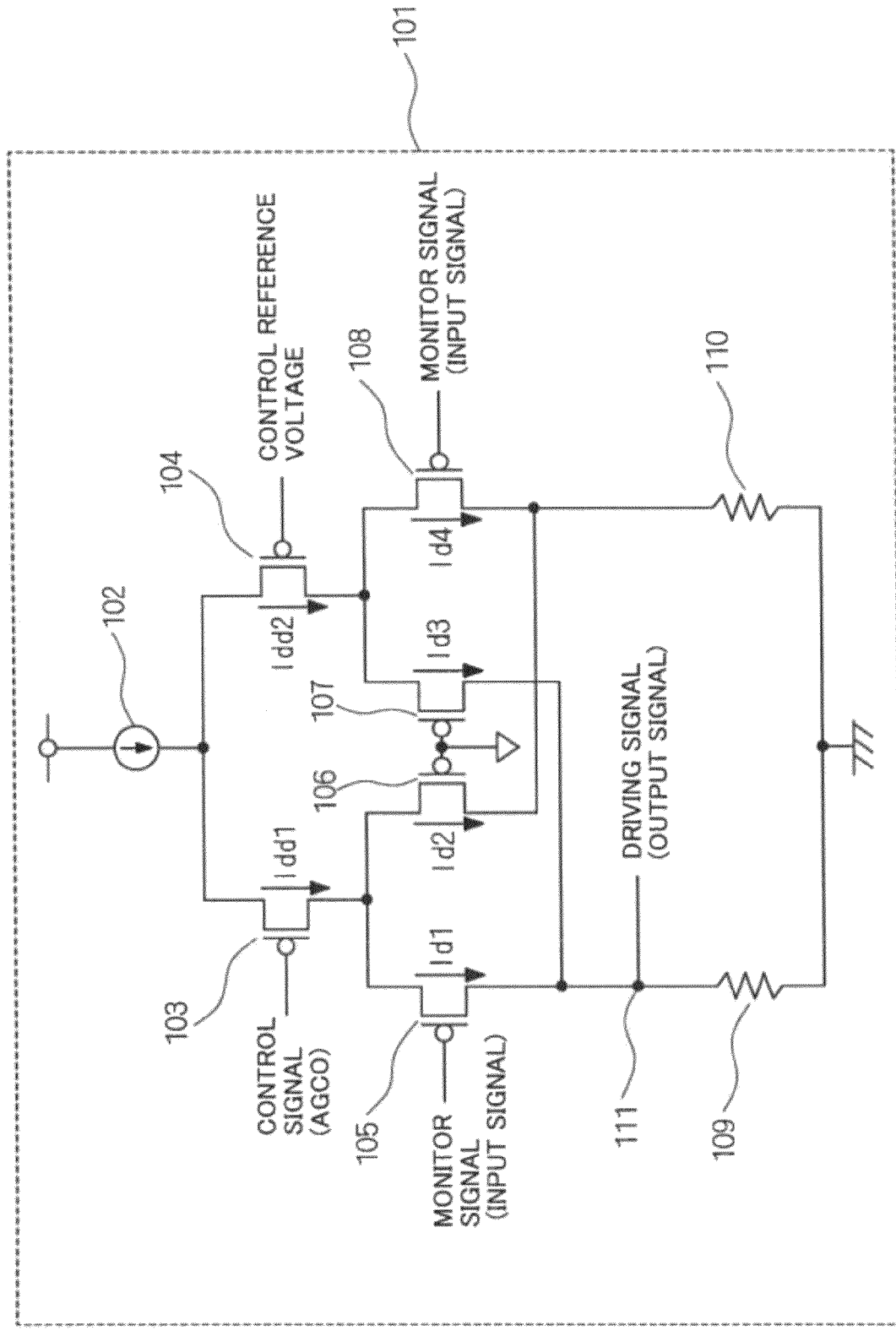
FIG. 3 is a circuit diagram representing a configuration of a VGA circuit changing the transconductance Gm, Gds of a MOSFET to control the degree of the amplification factor.

For example, in the case where a VGA circuit controlling the degree of the amplification factor of the VGA circuit with the current/voltage of the VGA circuit is used, the amplification factor of the VGA circuit will vary greatly depending on environmental change such as the ambient temperature and/or power supply voltage due to the physical property of the semiconductor constituting the VGA circuit. Further, the change in the amplification factor will be non-linear to the change of the AGCO signal since the VGA circuit is constituted by a change in the ON resistance of a MOSFET. The following description is based on the case using a VGA circuit controlling the degree of the amplification factor with the transconductance Gm, Gds of a MOSFET changed, among the type of VGA circuits controlling the degree of the amplification factor of the VGA circuit with the current/voltage of the VGA circuit. FIG. 3 is a circuit diagram representing a configuration of a VGA circuit controlling the degree of the amplification factor with the transconductance Gm, Gds of a MOSFET changed. A VGA circuit 101 shown in FIG. 3 includes a current source 102, P channel MOSFETs 103, 104, 105, 106, 107, and 108, and resistors 109 and 110. An AGCO signal is applied to the gate terminal of P channel MOSFET 103. A control reference voltage is applied to the gate terminal of P channel MOSFET 104. A monitor signal (input signal) is applied to the gate terminals of P channel MOSFETs 105 and 108. The driving signal (output signal) is output from a terminal 111 provided between the drain terminal of MOSFETs 105 and 107 and resistor 109.

Figure 4:
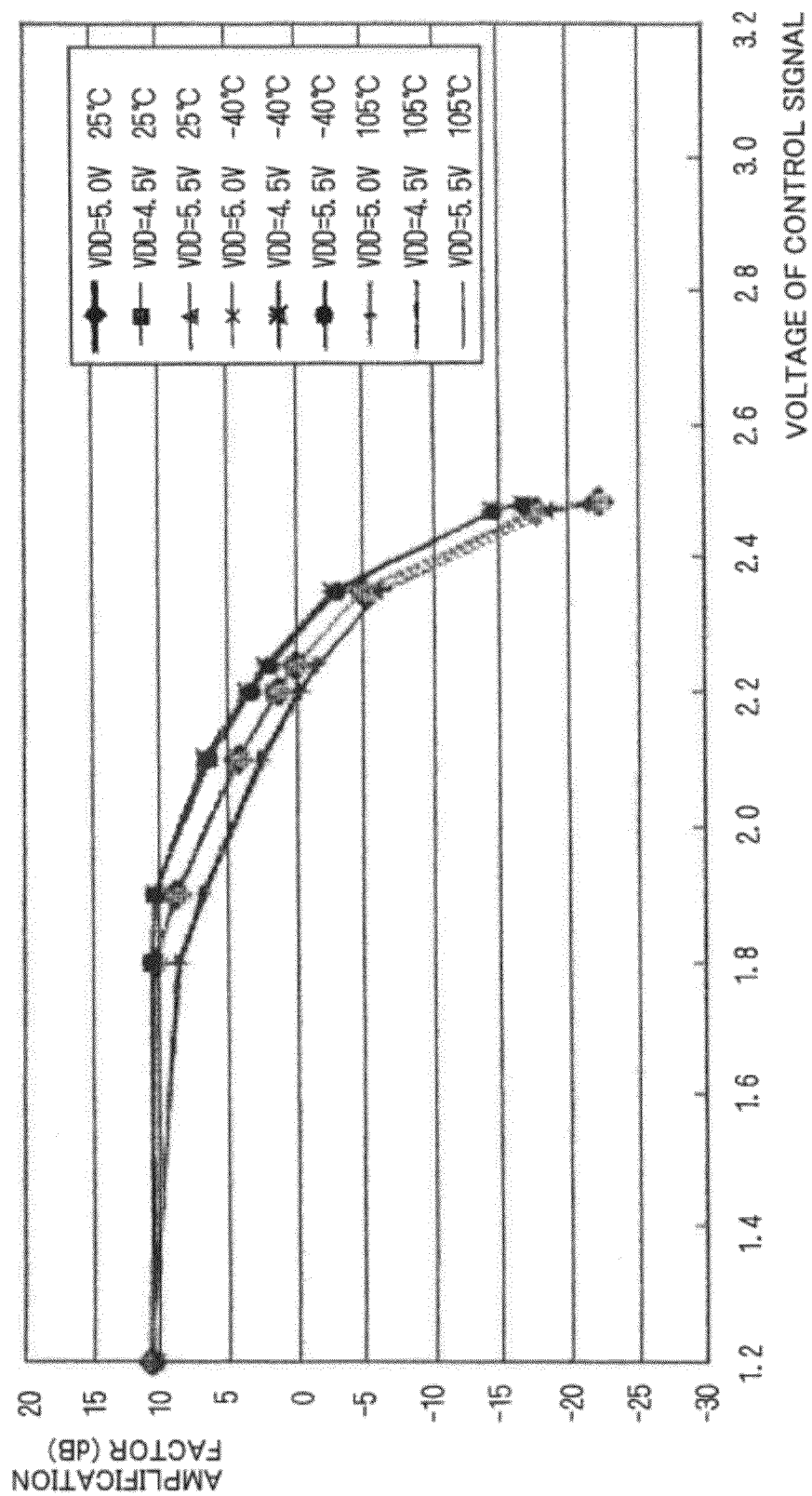
FIG. 4 exemplifies a change in the amplification factor of the VGA circuit to the voltage of a control signal when a VGA circuit changing the transconductance Gm, Gds of a MOSFET to control the degree of the amplification factor is used.

FIG. 4 exemplifies a change in the amplification factor of the VGA circuit to the voltage of a control signal when a VGA circuit changing the transconductance Gm, Gds of a MOSFET to control the degree of the amplification factor is used. In FIG. 4, the voltage of a control signal (AGCO signal) is plotted along the horizontal axis, and the VGA circuit amplification factor is plotted along the vertical axis. The change in the amplification factor of the VGA circuit to the voltage of the AGCO signal corresponding to the cases of varying the driving voltage VDD of the AGC circuit to 4.5V, 5.0V and 5.5V, and the ambient temperature to −40° C., 25° C. and 105° C. is indicated.

As appreciated from FIG. 4, the change in the amplification factor of the VGA circuit is non-linear to a change (voltage) of the AGCO signal. The VGA circuit amplification factor varies greatly depending upon the environmental change such as the ambient temperature and/or power supply voltage. In the case where the VGA circuit amplification factor changes greatly due to environmental change such as the ambient temperature and/or power supply voltage so that the change in the VGA circuit amplification factor is non-linear to a change (voltage) of the AGCO signal, the effect on control error ΔV in an oscillation of oscillator 1 is great from the relationship indicated in Equation 2. Therefore, when an AGC circuit with a VGA circuit is used for the oscillation circuit unit of an oscillation type inertia force sensor, the detection sensitivity of angular velocity (inertia force) of the oscillation type inertia force sensor will be greatly affected by individual variation between oscillation type inertia force sensors, the variation in the semiconductor element's resistance and capacitance, MOSFET process parameter fluctuations, and environmental change such as the ambient temperature and/or power supply voltage.

Thus, the oscillation type inertia force sensor according to a preferred embodiment of the present invention includes a PWM circuit 243 at a succeeding stage of comparison and smoothing circuit 242 of AGC circuit 24, as shown in FIG. 2, to modulate the output signal (driving signal) with the output of VGA circuit 244 switched between an ON state and OFF state based on the AGCO signal (pulse width modulation signal) modulated at PWM circuit 243 to control the degree of the amplification factor of VGA circuit 244. VGA circuit 244 includes a switch circuit that can modulate an output signal (driving signal) with the output of VGA circuit 244 switched between an ON state and OFF state based on the AGCO signal (pulse width modulation signal) modulated at PWM circuit 243, as will be described afterwards.

Figure 5:
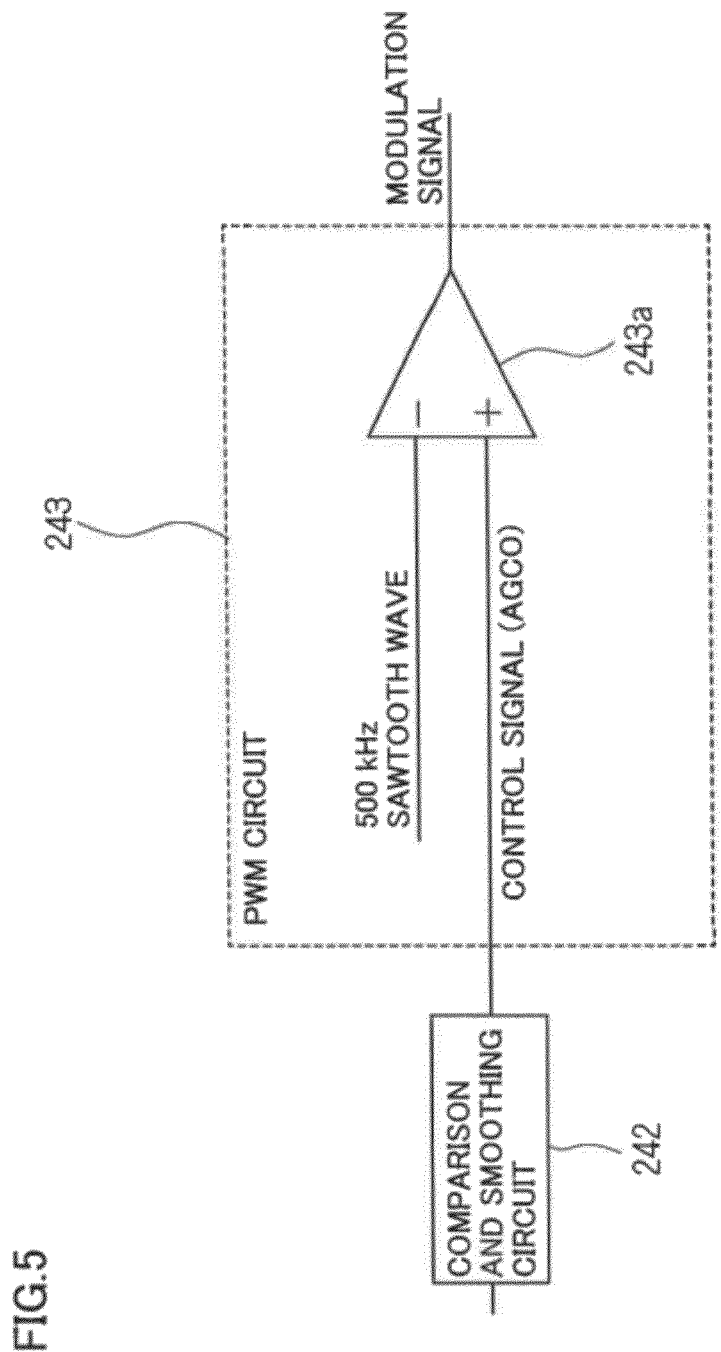
FIG. 5 is a circuit diagram representing a configuration of a PWM circuit of an oscillation type inertia force sensor according to a preferred embodiment of the present invention.

FIG. 5 is a circuit diagram representing a configuration of PWM circuit 243 of the oscillation type inertia force sensor according to a preferred embodiment of the present invention. As shown in FIG. 5, PWM circuit 243 includes a comparator 243a. Comparator 243a receives and compares the sawtooth wave of 500 kHz generated in PWM circuit 243 with an AGCO signal to output a rectangular wave of 500 kHz having the pulse width (duty ratio) changed according to the level of the AGCO signal (signal level) for output as a modulation signal of the AGCO signal (pulse width modulation signal).

Figure 6:
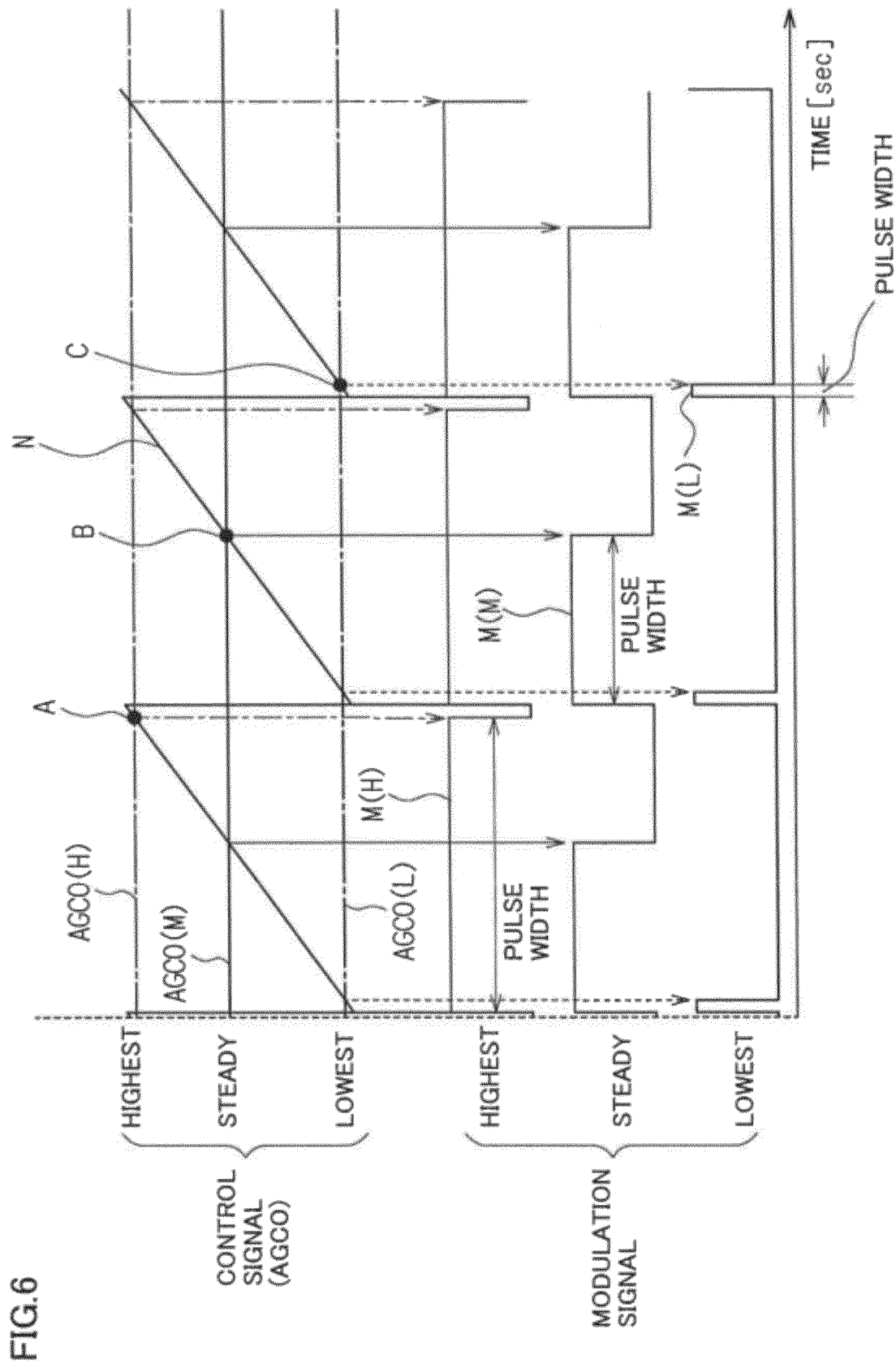
FIG. 6 exemplifies the relationship of an AGCO signal and sawtooth wave to a modulation signal of the AGCO signal.

FIG. 6 exemplifies the relationship of the AGCO signal and sawtooth wave to the modulation signal of the AGCO signal. FIG. 6 shows a sawtooth wave N of 500 kHz, an AGCO signal with the highest signal level (AGCO (H)), an AGCO signal with a signal level of a steady state (AGCO (M)), an AGCO signal with the lowest signal level (AGCO (L)), and modulation signals M (H), M (M) and M (L) of AGCO signals corresponding to the AGCO signals of respective signal levels. The AGCO signal with the highest signal level (AGCO (H)) corresponds to the highest amplification factor of VGA circuit 244 whereas the AGCO signal of the lowest signal level (AGCO (L)) corresponds to the smallest amplification factor of VGA circuit 244.

Modulation signal M (H) of the AGCO signal with the highest signal level has a pulse width up to a point A where the signal level attains the signal level of the highest AGCO signal (AGCO (H)) to the waveform of sawtooth wave N. The modulation signal M (M) of the AGCO signal with the signal level of a steady state has a pulse width up to a point B where the signal level attains the signal level of the AGCO signal (AGCO (M)) of a steady state to the waveform of sawtooth wave N. The modulation signal M (L) of the AGCO signal with the lowest signal level has a pulse width up to a point C where the signal level attains the signal level of the lowest AGCO signal (AGCO (L)) to the waveform of sawtooth wave N.

Figure 7:
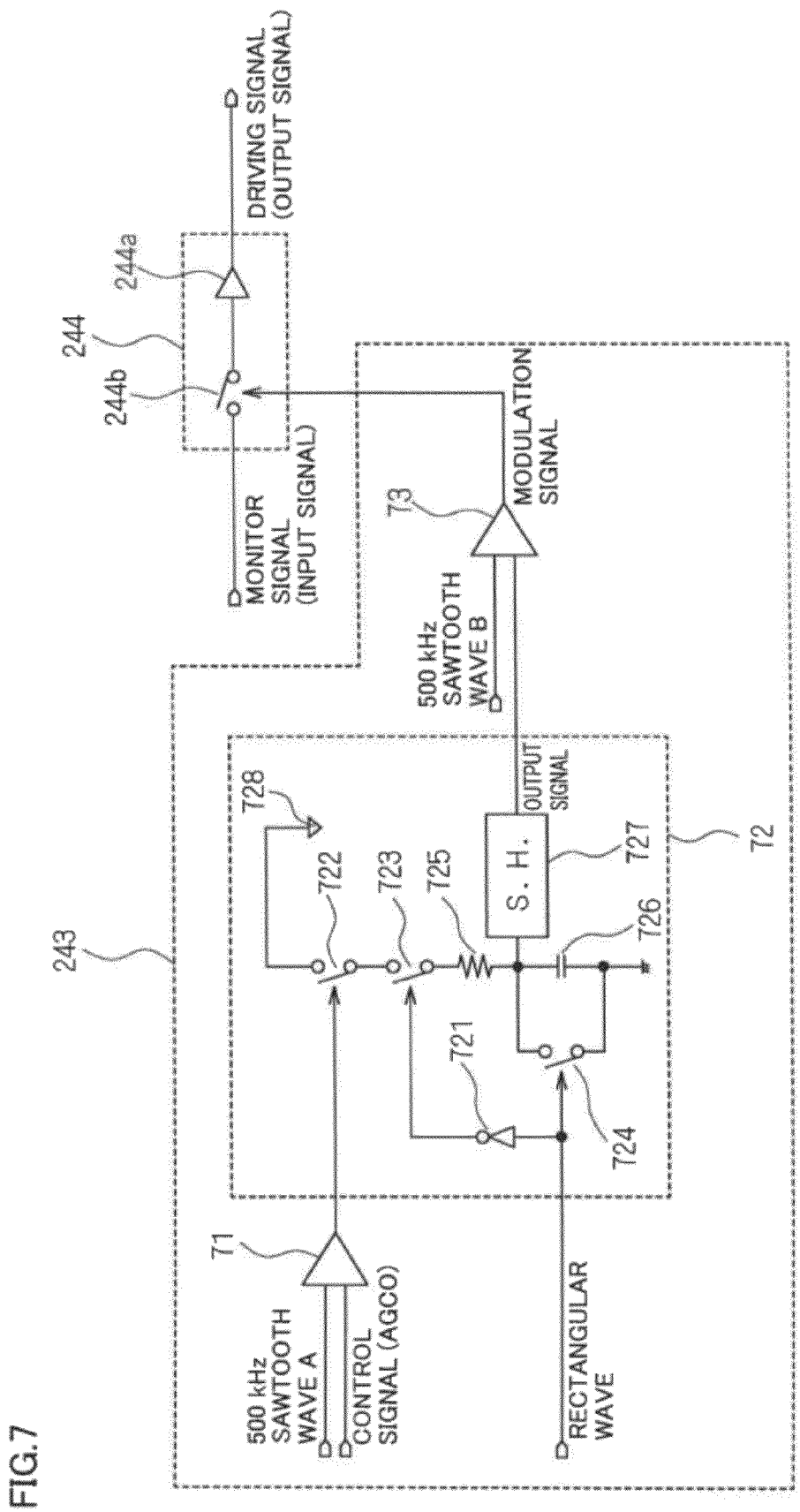
FIG. 7 is a circuit diagram representing another configuration of a PWM circuit of an oscillation type inertia force sensor according to a preferred embodiment of the present invention.

Another configuration and operation of PWM circuit 243 performing pulse width modulation based on an AGCO signal and sawtooth wave such that the change in the amplification factor of VGA circuit 244 becomes substantially linear logarithmically to a change of the control signal (AGCO signal) will be described. FIG. 7 is a circuit diagram representing another configuration of PWM circuit 243 of the oscillation type inertia force sensor according to a preferred embodiment of the present invention. The circuit diagram of FIG. 7 also depicts VGA circuit 244 in addition to PWM circuit 243 for the sake of explanation. PWM circuit 243 of FIG. 7 includes a first comparator 71, a step response circuit 72, and a second comparator 73. Step response circuit 72 includes an inverter 721, switch circuits 722, 723 and 724, a resistor 725, a capacitor 726, a sample hold circuit 727, and a voltage source 728. VGA circuit 244 includes an Op-Amp 244a that is an operational amplifier, and a switch circuit 244b.

Figure 8:
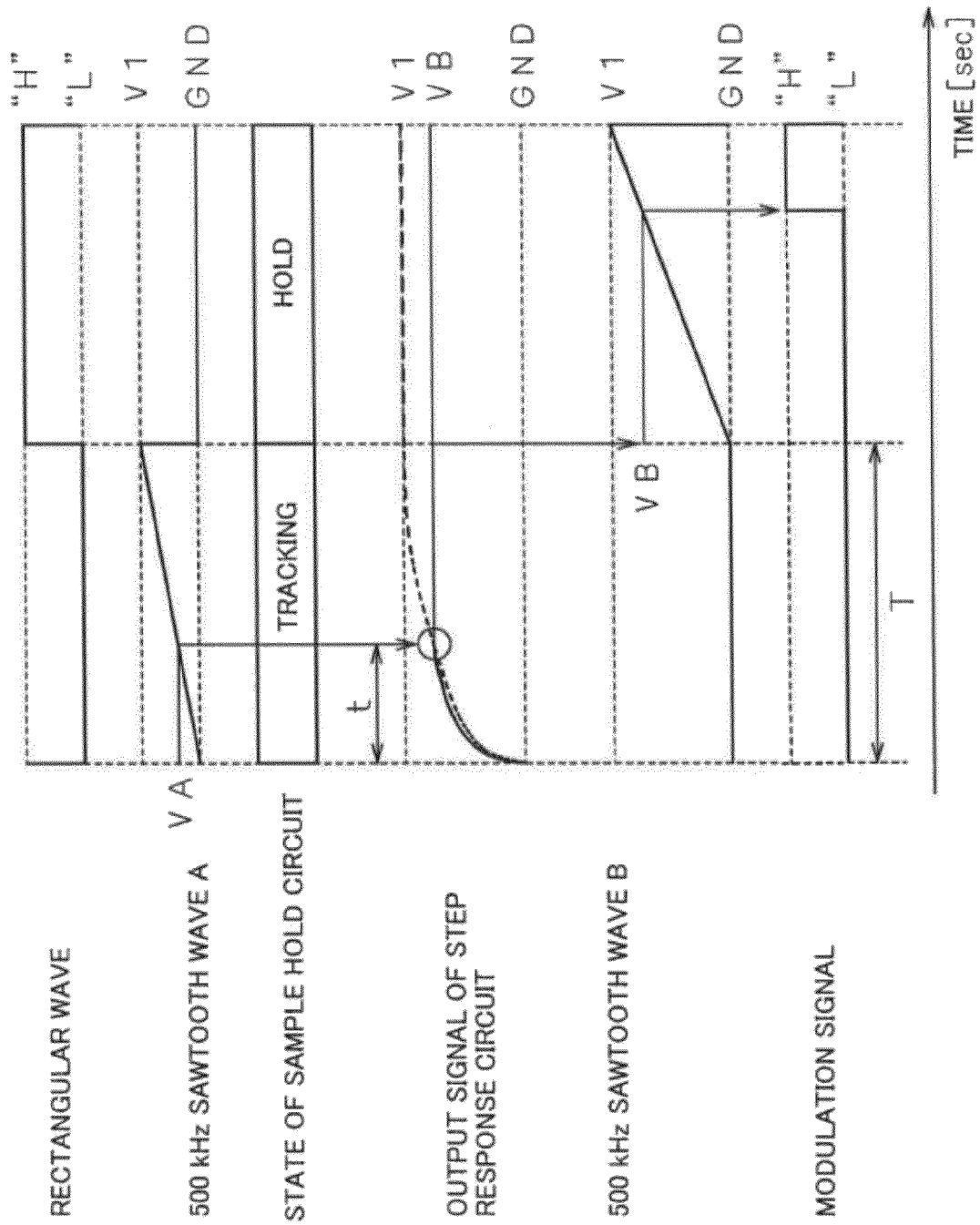
FIG. 8 is a timing chart representing respective timing of a rectangular wave, a sawtooth wave A, the state of a sample hold circuit, an output signal from a step response circuit, a sawtooth wave B, and a modulation signal that is the output signal from a second comparator.

PWM circuit 243 of FIG. 7 performs pulse width modulation based on an AGCO signal and sawtooth wave such that the change in the amplification factor of VGA circuit 244 is substantially linear logarithmically to a change of the AGCO signal. An AGCO signal and a sawtooth wave A of 500 kHz are applied to first comparator 71. The output signal of first comparator 71 and a rectangular wave are applied to step response circuit 72. The output signal from sample hold circuit 727 and a sawtooth wave B of 500 kHz are applied to the second comparator 73. FIG. 8 is a timing chart representing respective timing of a rectangular wave, a sawtooth wave A, the state of sample hold circuit 727, an output signal from step response circuit 72, a sawtooth wave B, and a modulation signal of an AGCO signal that is the output signal from second comparator 73.

The operation of PWM circuit 243 based on the timing chart of FIG. 8 will be described. First, during the period of the rectangular wave maintaining an "L" state from the transition of an "H" state (period 2T), switch circuit 724 is OFF whereas switch circuit 723 is ON. At this stage, the output signal of first comparator 71 causes switch circuit 722 to attain an ON state. Therefore, capacitor 726 is charged by voltage source 728 via switch circuits 722 and 723 and resistor 725. Since capacitor 726 has both ends connected to ground during the period of the rectangular wave maintaining an "H" state, capacitor 726 is charged from the point in time when the rectangular wave attains an "L" level from an "H" level. Capacitor 726 is charged according to a time constant that is determined based on the resistance of resistor 725 and the capacitance of capacitor 726, and has a step response property such that the voltage of capacitor 726 approaches asymptotically a voltage V1 of voltage source 728.

The charging of capacitor 726 continues until the voltage of the AGCO signal is inverted with respect to sawtooth wave A and the output signal of first comparator 71 (not shown) is inverted. When the output signal of first comparator 71 is inverted, switch circuit 722 attains an OFF state such that the charging towards capacitor 726 is stopped. For example, when an arbitrary voltage VA is applied to first comparator 71 as an AGCO signal, capacitor 726 is charged for t seconds to reach the level of voltage VB since the output signal of first comparator is not inverted until sawtooth wave A rises to voltage VA from GND (ground), as shown in FIG. 8. Voltage VB charged to capacitor 726 is tracked at sample hold circuit 727 during the period where the rectangular wave maintains an "L" state, and held at sample hold circuit 727 during the period where the rectangular wave maintains an "H" state.

First comparator 71 and step response circuit 72 are directed to converting the AGCO signal into an exponential function indicated in Equation 3.

$$VB = V1 \times \{1 - e^{(-t/\tau)}\} \qquad \text{(Equation 3)}$$

where τ is a time constant determined by the resistance of resistor 725 and the capacitance of capacitor 726, and t is the period of time of sawtooth wave A arriving at an arbitrary voltage VA from GND (ground) to be applied as the AGCO signal.

Second comparator 73 compares the output signal from step response circuit 72 with sawtooth wave B of 500 kHz to output a rectangular wave of 500 kHz having the pulse width changed according to the signal level as a modulation signal of the AGCO signal.

A sawtooth wave of 500 kHz is generated at a multivibrator type oscillation circuit including a resistor, capacitor, and comparator. Therefore, when the values of the resistor/capacitor vary greatly by the ambient temperature, the sawtooth wave also varies greatly by the environmental change such as ambient temperature and/or power supply voltage, so that the modulation signal that is output from PWM circuit 243 also varies greatly by the environmental change such as the ambient temperature and/or power supply voltage. However, PWM circuit 243 of FIG. 7 converts the AGCO signal into an exponential function taking advantage of the step response through resistor 725 and capacitor 726 of step response circuit 72. Therefore, the effect on the generation of a sawtooth wave depending upon the environmental change such as the ambient temperature and/or power supply voltage can be reduced.

Figure 9:
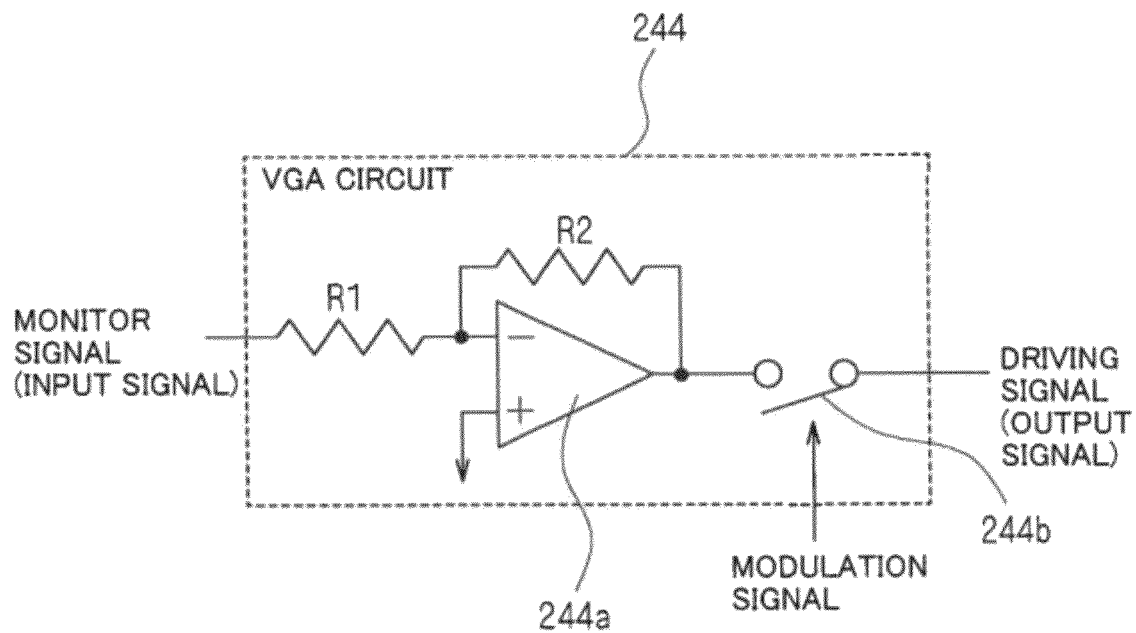
FIG. 9 is a circuit diagram representing a configuration of a VGA circuit of an oscillation type inertia force sensor according to a preferred embodiment of the present invention.

VGA circuit 244 is configured to allow modulation of the driving signal based on an AGCO signal subjected to pulse width modulation (pulse width modulation signal) at PWM circuit 243 shown in FIG. 5 or FIG. 7. FIG. 9 is a circuit diagram representing a configuration of VGA circuit 244 of the oscillation type inertia force sensor according to a preferred embodiment of the present invention. As shown in FIG. 9, VGA circuit 244 includes an Op-Amp 244a that amplifies a monitor signal input from filter circuit 23 (input signal), and a switch circuit 244b provided at an output terminal of Op-Amp 244a. Op-Amp 244a constitutes an inversion amplification circuit to amplify the monitor signal input from filter circuit 23 with an amplification factor determined by resistance R2/resistance R1. Switch circuit 244b switches between an ON state and an OFF state with a modulation signal of the AGCO signal to modulate a monitor signal amplified with a predetermined amplification factor at Op-Amp 244a, and supplies the modulated monitor signal to driving element 12 of oscillator 1 as the driving signal (output signal). Switch circuit 244b may be provided at the input terminal side of Op-Amp 244a, as shown in FIG. 7.

As shown in FIG. 6, the modulation signal of an AGCO signal has the pulse width increased as compared to the case where the signal level of the AGCO signal is steady, so that the ON state of switch circuit 244b becomes longer. A longer ON state of switch circuit 244b causes a higher ratio of the output signal of Op-Amp 244a included in the driving signal such that the amplification factor of VGA circuit 244 is increased.

In contrast, when the signal level of an AGCO signal is smaller than that of a steady state, the modulation signal of an AGCO signal has the pulse width reduced, leading to a longer OFF state of switch circuit 244b, as shown in FIG. 6. A longer OFF state of switch circuit 244b causes a lower ratio of the output signal of Op-Amp 244a included in the driving signal such that the amplification factor of VGA circuit 244 becomes smaller.

Figure 10:
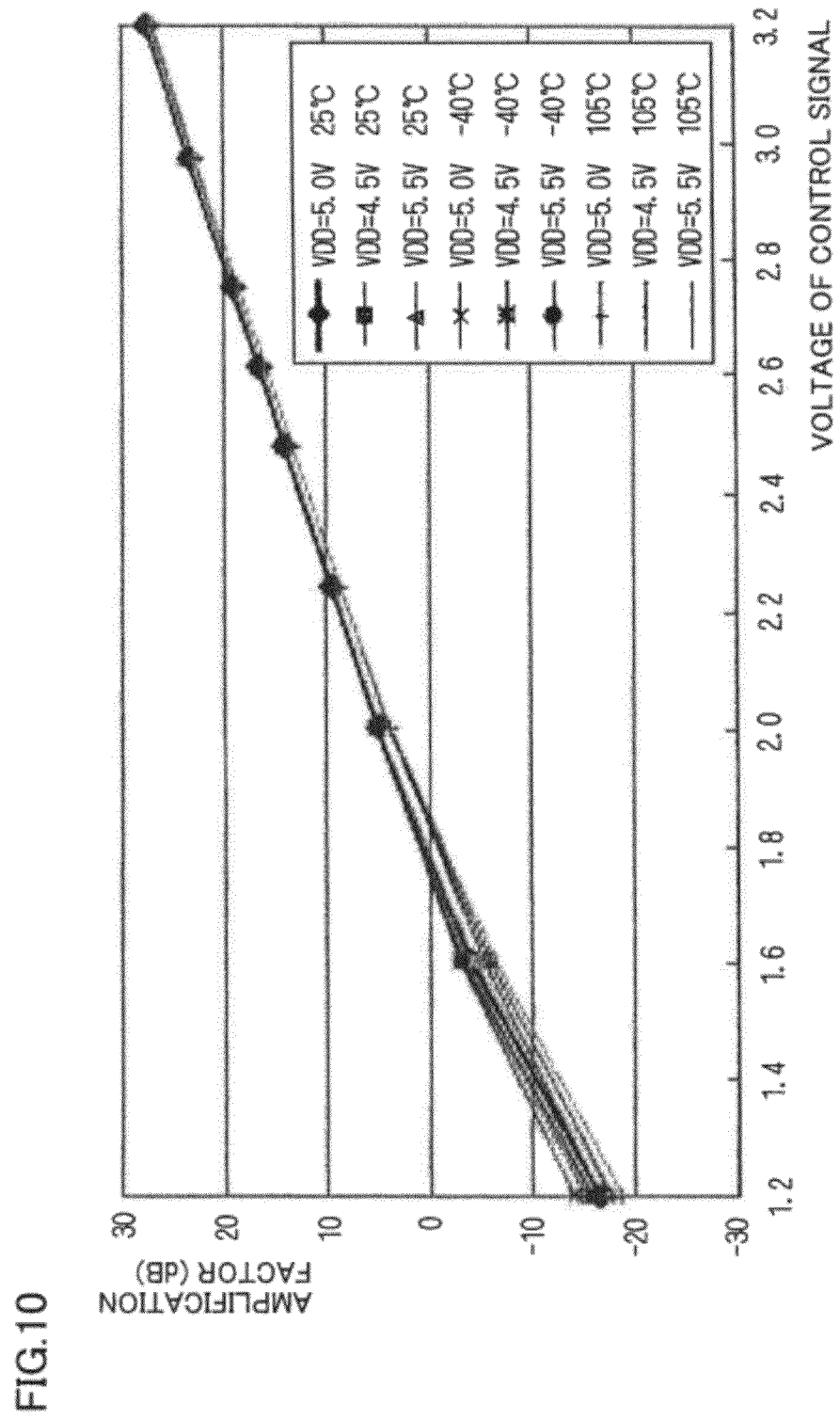
FIG. 10 exemplifies a change in the amplification factor of a VGA circuit to a control signal voltage when the output signal of the VGA circuit is modulated by a PWM circuit.

FIG. 10 exemplifies a change in the amplification factor of VGA circuit 244 to the voltage of a control signal when the output signal of VGA circuit 244 (driving signal) is modulated based on a pulse width modulation signal modulated at PWM circuit 243. In FIG. 10, the voltage of the control signal (AGCO signal) is plotted along the horizontal axis whereas the amplification factor of VGA circuit 244 is plotted along the vertical axis. The change in the amplification factor of VGA circuit 244 to the voltage of the AGCO signal corresponding to the cases of varying the driving voltage VDD of AGC circuit 24 to 4.5V, 5.0V and 5.5V, and the ambient temperature to −40° C., 25° C. and 105° C. is indicated.

As appreciated from FIG. 10, the change in the amplification factor of VGA circuit 244 is substantially linear to a change (voltage) of the AGCO signal. Variation in the amplification factor of VGA circuit 244 caused by environmental change such as the ambient temperature and/or power supply voltage is smaller than that of VGA circuit 101 shown in FIG. 3. In the case where variation in the amplification factor of VGA circuit 244 caused by environmental change such as the ambient temperature and/or power supply voltage of the amplification factor of VGA circuit 244 is small and a change in the amplification factor of VGA circuit 244 is substantially linear to a change (voltage) of the AGCO signal, the effect of the change in the ambient temperature and/or power supply voltage on control error ΔV in an oscillation of oscillator 1 is small from the relationship indicated in Equation 2. Therefore, when an AGC circuit 24 with PWM circuit 243 and VGA circuit 244 is included in oscillation circuit unit 2 of an oscillation type inertia force sensor, the detection sensitivity of angular velocity (inertia force) of the oscillation type inertia force sensor will be less susceptible to individual variation between oscillation type inertia force sensors, the variation in the semiconductor element's resistance and capacitance, MOSFET process parameter fluctuations, and environmental change such as the ambient temperature and/or power supply voltage.

Thus, according to an oscillation type inertia force sensor of a preferred embodiment of the present invention, since AGC circuit 24 includes a VGA circuit 244 that amplifies a motor signal, a comparison and smoothing circuit 242 that compares a predetermined reference voltage (VCTRL voltage) with the RECT voltage (monitor signal voltage) to output an AGCO signal that controls the degree of the amplification factor of VGA circuit 244 based on the compared result, and a PWM circuit 243 that modulates an AGCO signal output from comparison and smoothing circuit 242 to a pulse width modulation signal having a frequency higher than that of the monitor signal, the degree of the amplification factor of VGA circuit 244 is controlled, not by the current/voltage of VGA circuit 244, but by the switching period (pulse width). Specifically, based on an AGCO signal subjected to pulse width modulation (pulse width modulation signal) at PWM circuit 243, the driving signal is modulated with the output of VGA circuit 244 switched between an ON state and OFF state to control the degree of the amplification factor of VGA circuit 244. Therefore, the effect caused by the physical property of the semiconductor constituting VGA circuit 244 can be significantly reduced. Furthermore, the detection sensitivity of angular velocity (inertia force) is much less susceptible to the effect caused by individual variation between oscillation type inertia force sensors, the variation in the semiconductor element's resistance and capacitance, MOSFET process parameter fluctuations, and environmental change such as the ambient temperature and/or power supply voltage. The change in the amplification factor of VGA circuit 244 is substantially linear to a change of the AGCO signal. Therefore, the variable range of the amplification factor of VGA circuit 244 that can be used in module designing becomes wider as compared to that of a conventional oscillation type inertia force sensor.

Figure 11:
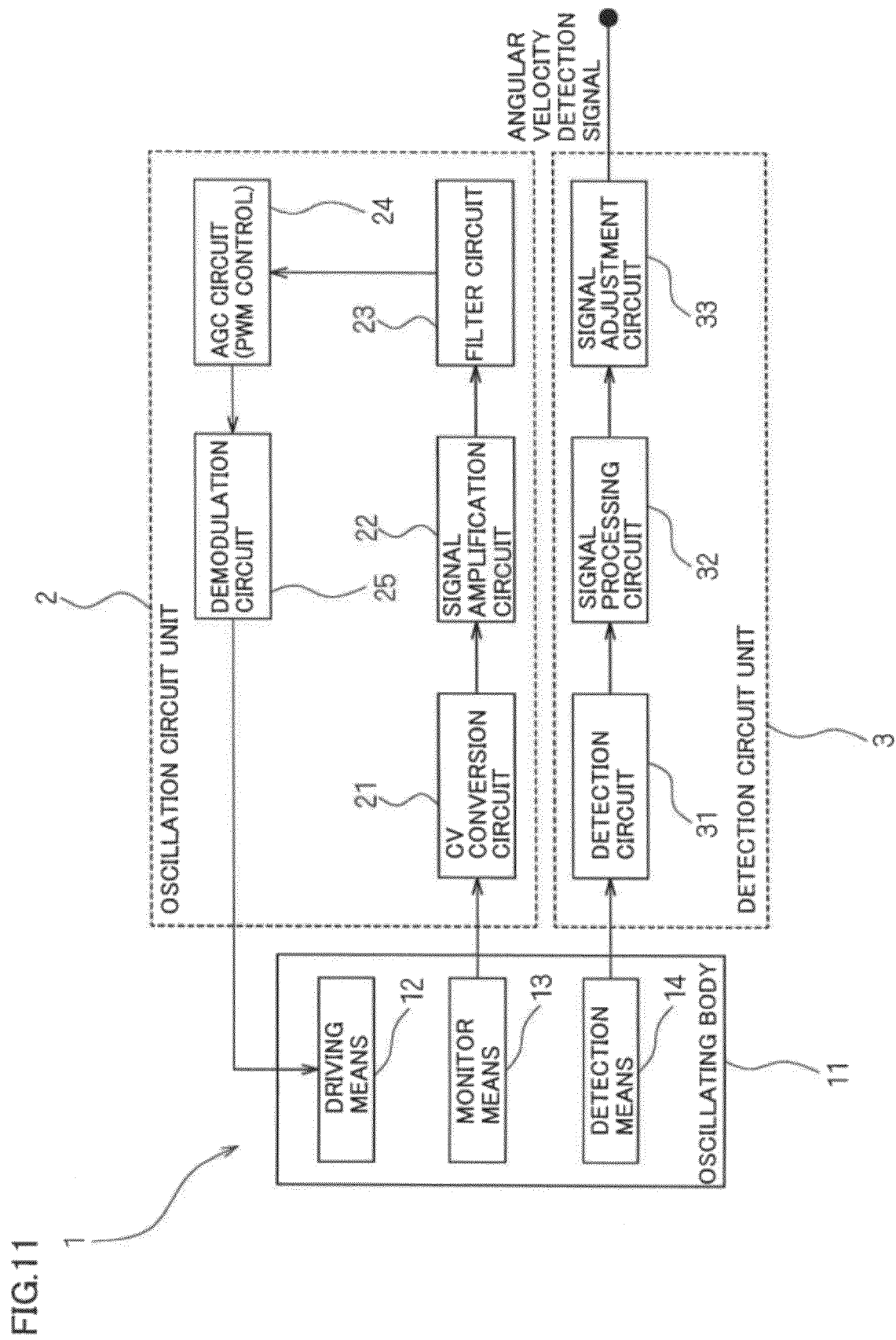
FIG. 11 is a block diagram representing another configuration of an oscillation type inertia force sensor according to a preferred embodiment of the present invention.
Figure 12:
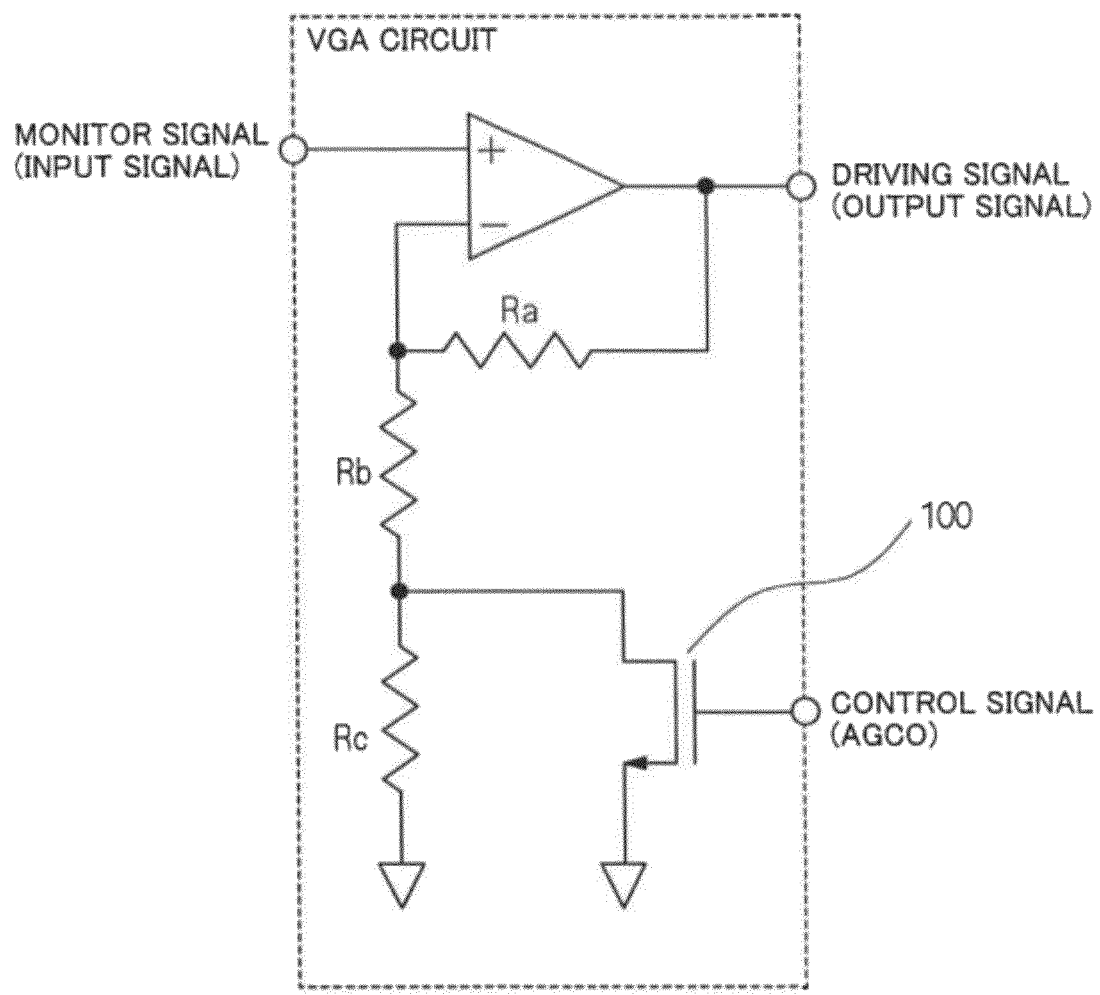
FIG. 12 is a circuit diagram representing a configuration of a conventional VGA circuit.

The oscillation type inertia force sensor according to a preferred embodiment of the present invention may include a demodulation circuit at a succeeding stage of VGA circuit 244. FIG. 11 is a block diagram representing another configuration of an oscillation type inertia force sensor according to a preferred embodiment of the present invention. As shown in FIG. 11, oscillation circuit unit 2 includes a demodulation circuit 25 at a succeeding stage of AGC circuit 24 (VGA circuit 244). Demodulation circuit 25 demodulates a modulated driving signal from AGC circuit 24 (VGA circuit 244) to output a driving signal that does not include the component of a pulse width modulation signal. Demodulation circuit 25 preferably includes a lowpass filter circuit, for example, to remove the overlapping signal component of 500 kHz from the driving signal to demodulate a modulated driving signal.

Since the frequency of the driving signal is generally approximately 15 kHz, lower than 500 kHz that is the frequency of the pulse width modulation signal, oscillator 1 can be driven by a modulated driving signal even in the case where demodulation circuit 25 is not provided. However, when a signal component of 500 kHz overlapping on the modulated driving signal (high frequency wave) is applied to detection circuit unit 3, the signal component of 500 kHz (high frequency wave) may be output as the noise of the angular velocity detection signal detected at detection circuit unit 3. Thus, in another configuration of an oscillation type inertia force sensor according to a preferred embodiment of the present invention, a demodulation circuit 25 is arranged at a succeeding stage of VGA circuit 244. By demodulation at demodulation circuit 25 into a driving signal absent of a signal component of 500 kHz (high frequency wave) that is a pulse width modulation signal, any output of a signal component of 500 kHz (high frequency wave) as the noise of a angular velocity detection signal detected at detection circuit unit 3 can be avoided. Demodulation circuit 25 is not limited to the arrangement outside of AGC circuit 24, and may be provided in AGC circuit 24 as long as it is located at a succeeding stage of VGA circuit 244.

Figure 13:
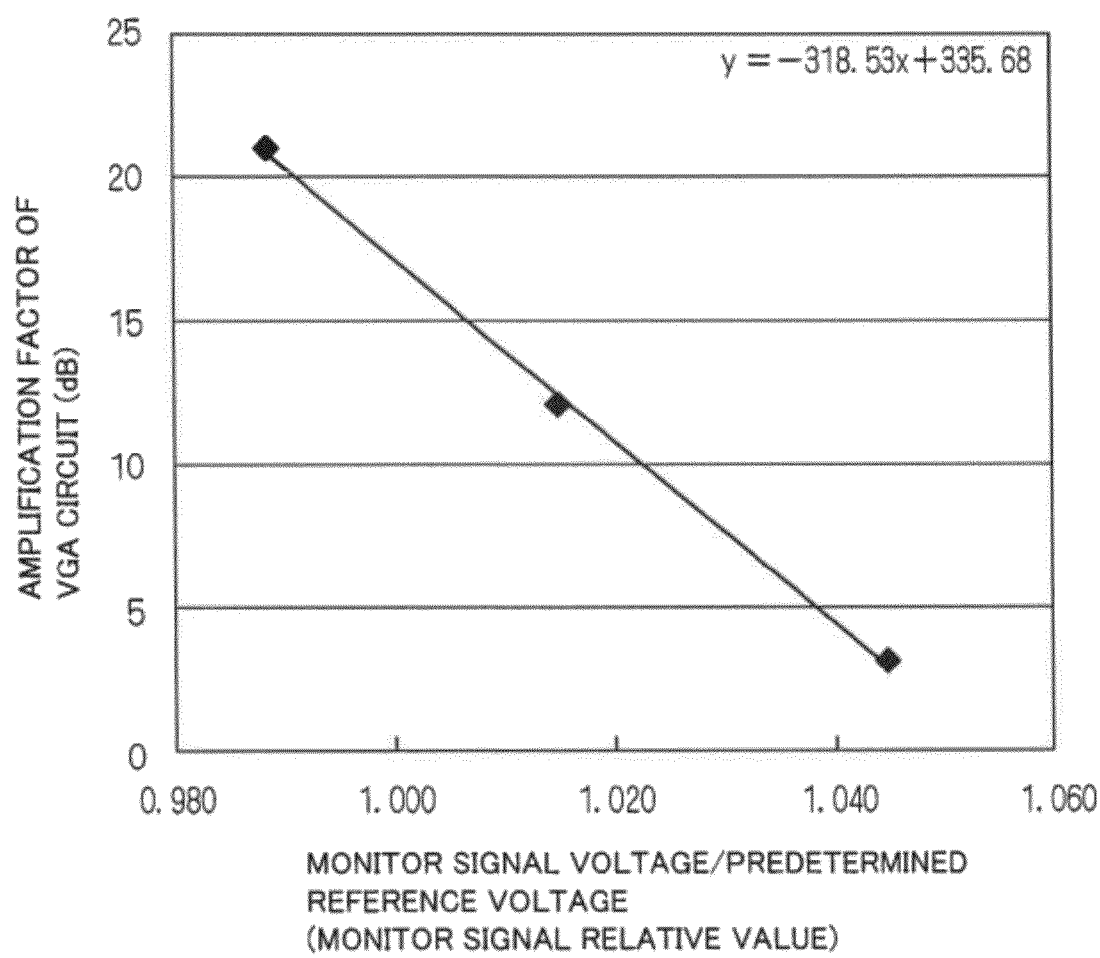
FIG. 13 is a graph representing the relationship of the ratio between the voltage of the monitor signal and a predetermined reference voltage to the amplification factor of the VGA circuit.

In order to be less susceptible to the effect caused by individual variation between oscillation type inertia force sensors, the variation in the semiconductor element's resistance and capacitance, MOSFET process parameter fluctuations, and environmental change such as the ambient temperature and/or power supply voltage, conventionally the amplification factor of the control signal had to be set at a sufficiently high value with respect to the control error in the oscillation of the oscillator. As appreciated from the relationship of Equation 2, by setting an amplification factor Gctrl of the control signal at a sufficiently high value with respect to control error $\Delta V$ in an oscillation of oscillator 1, the control error $\Delta V$ in an oscillation of oscillator 1 becomes relatively small, leading to a smaller control error $\Delta V$ in an oscillation of oscillator 1 caused by the effect of individual variation between oscillation type inertia force sensors, the variation in the semiconductor element's resistance and capacitance, MOSFET process parameter fluctuations, and environmental change such as the ambient temperature and/or power supply voltage. When comparison and smoothing circuit 242 amplifies the difference between the predetermined reference voltage and monitor signal voltage with a predetermined amplification factor of a control signal to output a control signal, a slope of the amplification factor of VGA circuit 244 to the ratio between the voltage of the monitor signal and the predetermined reference voltage (voltage of monitor signal/predetermined reference voltage) can be used as an index alternative to amplification factor Gctrl of the control signal. FIG. 13 is a graph representing the relationship of the ratio between the voltage of the monitor signal and a predetermined reference voltage to the amplification factor of VGA circuit 244. The relationship of the ratio between the voltage of the monitor signal and the predetermined reference voltage to the amplification factor of VGA circuit 244 shown in FIG. 13 is the result obtained by simulation. The ratio between the voltage of the monitor signal and the predetermined reference voltage is referred to as a monitor signal relative value, and is 1 when the monitor signal voltage is adjusted to a predetermined reference voltage. The slope of the amplification factor of VGA circuit 244 to the monitor signal relative value is always negative. The absolute value of the slope corresponds to the amplification factor Gctrl of the control signal. The absolute value of the slope of the amplification factor of VGA circuit 244 with respect to the monitor signal relative value shown in FIG. 13 is 318.53 dB, less than or equal to about 320 dB, for example. In other words, at the oscillation type inertia force sensor according to a preferred embodiment of the present invention, amplification factor Gctrl of the control signal can be set to less than or equal to about 320 dB, for example.

In the oscillation type inertia force sensor according to a preferred embodiment of the present invention, the absolute value of the slope of the amplification factor of VGA circuit 244 with respect to the monitor signal relative value (amplification factor of the control signal) does not have to set greater than approximately 320 dB in order to be less susceptible to individual variation between oscillation type inertia force sensors, the variation in the semiconductor element's resistance and capacitance, MOSFET process parameter fluctuations, and environmental change such as the ambient temperature and/or power supply voltage. According to the oscillation type inertia force sensor of a preferred embodiment of the present invention, the angular velocity can be detected without being affected by individual variation between oscillation type inertia force sensors, the variation in the semiconductor element's resistance and capacitance, MOSFET process parameter fluctuations, and environmental change such as the ambient temperature and/or power supply voltage even when the absolute value of the slope of the amplification factor of VGA circuit 244 with respect to the monitor signal relative value (amplification factor Gctrl of the control signal) is set to be less than or equal to about 320 dB, for example. Furthermore, in contrast to a conventional oscillation type inertia force sensor having the problem of the operation of the oscillation circuit unit being rendered unstable by setting the value of the amplification factor of the control signal too large with respect to the control error in an oscillation of the oscillator, the oscillation type inertia force sensor according to a preferred embodiment of the present invention can detect the angular velocity at a range where the operation of oscillation circuit unit 2 is stable since the absolute value of the slope of the amplification factor of VGA circuit 244 relative to the monitor signal relative value can be set to be less than or equal to about 320 dB, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. An oscillation type inertia force sensor comprising:
an oscillator used to detect inertia force;
an oscillation circuit unit that supplies a driving signal to the oscillator; and
a detection circuit unit that detects inertia force of the oscillator; wherein
the oscillation circuit unit is a self oscillation circuit of a closed loop with the oscillator defining a resonant element, and includes an automatic gain control circuit that amplifies a monitor signal according to an oscillating state of the oscillator to generate and supply to the oscillator the driving signal;
the automatic gain control circuit includes:
an amplification circuit that amplifies the monitor signal;
a comparison circuit that compares a predetermined reference voltage with a voltage of the monitor signal to output a control signal to control a degree of an amplification factor of the amplification circuit based on a compared result; and
a pulse width modulation circuit that modulates the control signal output from the comparison circuit into a pulse width modulation signal having a frequency higher than a frequency of the monitor signal; wherein
based on the pulse width modulation signal modulated at the pulse width modulation circuit, the driving signal is modulated with an output of the amplification circuit switched between an ON state and an OFF state to control the degree of the amplification factor of the amplification circuit.

2. The oscillation type inertia force sensor according to claim 1, further comprising a demodulation circuit at a succeeding stage of the amplification circuit to demodulate the driving signal modulated with the output of the amplification circuit switched between the ON state and the OFF state based on the pulse width modulation signal.

3. The oscillation type inertia force sensor according to claim 1, wherein, when the comparison circuit amplifies a difference between the predetermined reference voltage and the voltage of the monitor signal with a predetermined amplification factor of the control signal to output the control signal, an absolute value of a slope of the amplification factor of the amplification circuit to a ratio between the voltage of the monitor signal and the predetermined reference voltage is less than or equal to about 320 dB.

* * * * *